United States Patent
Barea et al.

(10) Patent No.: US 10,244,586 B2
(45) Date of Patent: Mar. 26, 2019

(54) MICROWAVEABLE CONTAINER

(71) Applicant: Dart Industries Inc., Orlando, FL (US)

(72) Inventors: Hector J. Barea, Orlando, FL (US); Mark T. Terrill, Jr., Orlando, FL (US); JianJun Luo, Guangzhou (CN)

(73) Assignee: Dart Industries Inc., Orlando, FL (US)

( * ) Notice: Subject to any disclaimer, the term of this patent is extended or adjusted under 35 U.S.C. 154(b) by 164 days.

(21) Appl. No.: 15/223,132

(22) Filed: Jul. 29, 2016

(65) Prior Publication Data

US 2018/0035494 A1    Feb. 1, 2018

(51) Int. Cl.
*H05B 6/80* (2006.01)
*H05B 6/64* (2006.01)
*B21D 51/18* (2006.01)
*B65D 1/34* (2006.01)
*B65D 43/02* (2006.01)
*A47J 36/02* (2006.01)
*B29C 45/14* (2006.01)

(52) U.S. Cl.
CPC .......... *H05B 6/6494* (2013.01); *A47J 36/027* (2013.01); *B21D 51/18* (2013.01); *B65D 1/34* (2013.01); *B65D 43/02* (2013.01); *H05B 6/6408* (2013.01); *B29C 2045/14327* (2013.01)

(58) Field of Classification Search
CPC ...... H05B 6/64; H05B 6/6408; H05B 6/6494; H05B 6/80; B65D 43/02; B65D 1/28; B65D 1/34; B65D 2581/3406; B65D 2581/3477; B65D 81/3446; B65D 81/3453; B65D 81/3818; B21D 51/18; B29C 2045/14327; A47J 36/027

USPC ................ 219/725, 730, 732, 734, 735, 759
See application file for complete search history.

(56) References Cited

U.S. PATENT DOCUMENTS

| | | | |
|---|---|---|---|
| 4,266,108 A | | 5/1981 | Anderson et al. |
| 4,351,997 A | * | 9/1982 | Mattisson .......... B65D 81/3453 219/734 |
| 4,454,403 A | | 6/1984 | Teich et al. |
| 5,107,087 A | * | 4/1992 | Yamada ............. B65D 81/3453 219/730 |

(Continued)

FOREIGN PATENT DOCUMENTS

| | | |
|---|---|---|
| KR | 2002500780000 | 9/2001 |
| KR | 2002593550000 | 12/2001 |

(Continued)

*Primary Examiner* — Hung D Nguyen
(74) *Attorney, Agent, or Firm* — Taylor J. Ross

(57) ABSTRACT

A microwaveable container comprising a pan and a pan cover, the pan comprising a bottom, a continuous wall, a rim, a first heating layer and a first polymeric layer; the pan cover comprising an upper surface, a lower surface, an outer side edge, a second polymeric layer, and a second heating layer, the first heating layer being attached to the pan bottom, the second heating layer being attached to the pan cover, and wherein the first polymeric layer is attached to the rim, the first heating layer and the pan bottom, the second polymeric layer being attached to the pan cover and the second heating layer; the first and second heating layers independently comprising: a susceptor powder selected from manganese zinc ferrite, nickel zinc ferrite, strontium ferrite or mixtures thereof; and a polymer matrix selected from a silicone rubber, a liquid crystal polymer, a polyphenylene sulfide polymer or mixtures thereof.

24 Claims, 6 Drawing Sheets

(56) References Cited

U.S. PATENT DOCUMENTS

| | | | | |
|---|---|---|---|---|
| 5,139,826 | A | * | 8/1992 | Kuziemka ............. A47J 36/027 427/380 |
| 5,213,227 | A | * | 5/1993 | Koyama ................. B65D 1/28 220/359.3 |
| 5,268,546 | A | | 12/1993 | Berg |
| 5,523,549 | A | | 6/1996 | Tenzer |
| 5,587,099 | A | | 12/1996 | Kuhn et al. |
| 5,665,819 | A | | 9/1997 | Tenzer |
| 6,077,454 | A | | 6/2000 | Tenzer |
| 2006/0237451 | A1 | | 10/2006 | Sameuls et al. |
| 2008/0217328 | A1 | | 9/2008 | Barnes |

FOREIGN PATENT DOCUMENTS

| | | |
|---|---|---|
| KR | 2002878960000 | 8/2002 |
| KR | 2002981230000 | 11/2002 |
| KR | 2002981290000 | 11/2002 |
| KR | 2003002700000 | 12/2002 |
| KR | 2003093210000 | 3/2003 |
| KR | 2003236550000 | 8/2003 |
| KR | 2003465230000 | 3/2004 |
| KR | 1020040028471 | 4/2004 |
| KR | 2003516530000 | 5/2004 |
| KR | 2003715560000 | 12/2004 |
| KR | 1006937570000 | 3/2007 |
| KR | 1007140530000 | 4/2007 |
| KR | 1009375340000 | 1/2010 |
| KR | 1012699200000 | 5/2013 |
| KR | 1012699210000 | 5/2013 |
| KR | 1020130134954 | 12/2013 |

* cited by examiner

MICROWAVEABLE CONTAINER

CROSS-REFERENCE TO RELATED APPLICATIONS

This application is related to Ser. Nos. 29/572,669, filed Jul. 29, 2016 (now D815,495, issued Apr. 17, 2018) and 29/572,670, filed Jul. 29, 2016 (now D807,112, issued Jan. 9, 2018), which are incorporated herein by reference.

FIELD OF THE INVENTION

The present invention relates to a microwaveable container. More particularly, the present invention relates to a microwaveable container equipped with over-molded heat susceptors and dual-metal surface cooking capability, having improved durability.

BACKGROUND OF THE INVENTION

For over thirty years, microwaves have enjoyed ever-increasing use in consumer kitchens. Today, it would be difficult to find a household without one. However, despite such widespread success, microwave cooking has traditionally suffered from the inability to cook certain foods in a satisfactory way. For example, while microwaves have always excelled in popping popcorn, heating leftovers or defrosting foods, the cooking of meats has resulted in tough meat that is not browned. The browning of food, and in particular the searing of meats to provide the taste experience of crisped surfaces produced on stovetops, has long been a goal of microwave-using cooks. The ability of a microwave container to brown food is a desirable characteristic.

Microwaveable containers must also be durable and convenient to use. One key reason for the success of microwave cooking is the ease and speed with which it is conducted. This has met a need in modern households, where set-piece meals have become less common. To avoid undermining this prime benefit of microwaves, however, a microwaveable container should be easily cleaned in the sink, so that the container, once used, can quickly be returned to action. This requires simplicity of design that avoids configurations having numerous interconnecting parts, or the need for disassembly to clean, since if the container must be taken apart to clean hard-to-access areas, or if many parts must be cleaned, it cannot be quickly reused.

Durability is also a necessary attribute of microwaveable containers. Since a microwave is often used numerous times for a single family meal, microwaveable containers must accommodate this requirement. This necessitates that outer contact surfaces of the container be sufficiently hard so as not to be damaged or dislodged in the normal wear and tear that will be encountered on countertop, sink or dishwasher.

Finally, the microwaveable container must comply with all regulatory requirements associated with food-handling containers.

Efforts have been ongoing to improve microwaveable containers. U.S. Pat. No. 7,067,778 discloses a microwaveable cooking container and microwave oven. U.S. Pat. No. 4,870,233 discloses a metal tray and susceptor for use in microwave ovens. U.S. Patent Application Publication No. 2006/0237451 and U.S. Pat. No. 8,269,154 disclose ovenware for microwave ovens. U.S. Pat. Nos. 5,523,549, 5,665,819, and 6,077,454 disclose ferrite compositions for use in microwave ovens. Nevertheless, a continuing need exists for microwaveable containers having durable design that are capable of browning food similar to stovetop cooking.

SUMMARY OF THE INVENTION

In one embodiment, the invention relates to a microwaveable container comprising a pan and a pan cover. The pan comprises a bottom, a continuous wall, a rim, a first heating layer and a first polymeric layer. The bottom comprises an upper surface and a lower surface. The first heating layer comprises an upper surface and a lower surface, the upper surface of the first heating layer being attached to the bottom lower surface. The continuous wall projects upwardly along the periphery of the bottom, and comprises a top, a base, an inner surface and an outer surface; the rim extends outwardly from the top of the continuous wall, and comprises a top surface, a bottom surface, and an outer side edge; and the first polymeric layer is attached to the rim top surface, the outer side edge of the rim, the lower surface of the first heating layer, and the lower surface of the pan bottom. The pan cover comprises an upper surface, a lower surface, an outer side edge, a second polymeric layer, and a second heating layer comprising an upper surface and a lower surface, the lower surface of the second heating layer being attached to the upper surface of the pan cover, and wherein the second polymeric layer is attached to the pan cover upper surface, the upper surface of the second heating layer and the pan cover side edge. The first and second heating layers independently comprise a susceptor powder selected from manganese zinc ferrite, nickel zinc ferrite, strontium ferrite or mixtures thereof, and a polymer matrix selected from a silicone rubber, a liquid crystal polymer, a polyphenylene sulfide polymer or mixtures thereof, the susceptor powder being dispersed in the polymer matrix, and where the first and second heating layers have a Shore A hardness of 5 to 70.

In another embodiment, the invention relates to a process for fabricating a microwaveable container. The process comprises first deep drawing a first metal blank to form an unfinished pan comprising a bottom, a continuous wall, and a rim; the bottom comprising an upper surface and a lower surface, the continuous wall projecting upwardly along the periphery of the bottom, and comprising a top, a base, an inner surface and an outer surface, the rim extending outwardly from the top of the continuous wall, and comprising a top surface, a bottom surface, and an outer edge. Next, a second metal blank is deep drawn to form an unfinished pan cover, the pan cover comprising an upper surface, a lower surface, and an outer side edge. Then, the rim is pierced to form a plurality of perforations in the rim of the unfinished pan. Next, a nonstick coating is applied to the pan bottom upper surface, continuous wall inner surface and the pan cover lower surface. A heating layer comprising a susceptor powder dispersed in a polymer matrix is over-molded onto the pan bottom lower surface, thereby forming a treated pan bottom. Next, the heating layer is over-molded onto the pan cover upper surface, thereby forming a treated pan cover. Then a pre-molded handle is attached to the treated pan cover, thereby forming a molded assembly. Next, the polymeric layer is over-molded onto the molded assembly in a mold. Finally, the polymeric layer is over-molded onto the treated pan bottom.

BRIEF DESCRIPTION OF THE DRAWINGS

The subject matter of the present disclosure will be more fully understood from the following detailed description, taken in connection with the accompanying drawings, in which.

DETAILED DESCRIPTION OF THE INVENTION

Figure 1:
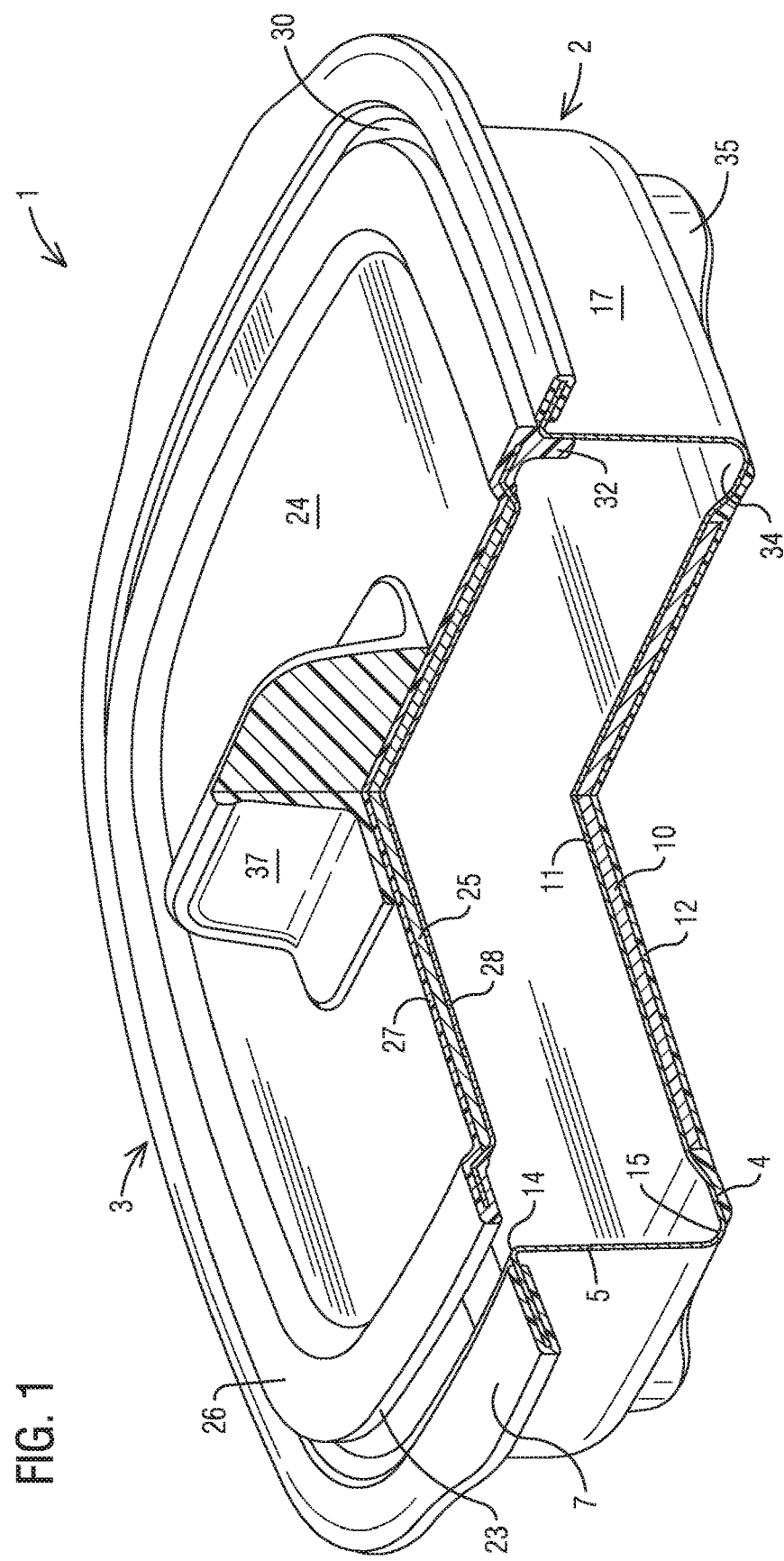
FIG. 1 illustrates a cut-away view of the microwaveable container with the pan cover at the top of the continuous wall.

The subject matter of the present disclosure relates to a microwaveable container comprising a pan and a pan cover. The pan and/or pan cover cook food with heat energy converted from microwave energy by susceptors dispersed in heating layers over-molded to the pan and/or pan cover. The pan and pan cover are deep drawn from metal blanks, and are further over-molded with polymeric layers. Primers are applied to the bare metal surfaces prior to over-molding of the heating layer or polymeric layer. Anti-stick coatings are applied to metal surfaces contacting food.

Susceptors

The microwaveable container includes susceptors that are dispersed in a polymeric matrix. The susceptor/polymer matrix composition is over-molded onto the pan cover and pan as heating layers. Susceptors are materials that possess magnetic properties which interact with the microwave energy of the microwave in such a way as to convert the microwave energy into heat energy. A property of susceptors is their Curie Temperature, Tc. At temperatures below the Curie Temperature, the susceptor converts microwave energy to heat energy. Above the Curie Temperature, the susceptor substantially loses its ability to convert the microwave energy. As a result, the susceptor functions much like a thermostat, heating up as it converts the microwave energy to heat energy until it reaches its Tc. At that point, the energy conversion is significantly reduced and the temperature ceases to rise or begins to drop. When the susceptor temperature falls below its Tc, the susceptor again begins to process the microwave energy, and its temperature again rises to Tc.

The effectiveness of the susceptor to convert microwave energy to heat energy is determined not only by its chemical composition and concentration in the polymer matrix, but by its morphology, e.g., whether it is fully sintered, and its particle size, as well as the heat transfer properties of the polymer matrix, and whether it interacts with microwave energy. Ideally, the thermal conductivity of the polymer matrix is high, so that as the susceptor temperature increases, heat energy is efficiently transferred to the polymer, and then to the metal surface of the pan or pan cover which heats the food present in the microwaveable container.

Preferably, the susceptor is present as a powder in the polymer matrix, the powder having an average particle diameter range of 1 to 500 microns. Preferably the average particle diameter of the susceptor powder is from 1 to 13 microns. Even more preferably, the average particle diameter of the susceptor powder is from 1 to 5 microns.

The susceptor powder is dispersed within the polymer matrix using conventional mixing equipment, e.g., blenders or extruders, where the polymer is present as a solid, liquid, partially melted material or combinations thereof.

The Curie Temperature of the susceptor powder is chosen to provide for optimal cooking conditions of the food. Too high a temperature can result in unevenly cooked, dry, or burned food. Too low a temperature can result in difficulty browning food or an increase in the length of cooking. Preferably, the susceptor powder has a Curie Temperature from higher than 175° C. to lower than 260° C. More preferably, the Curie Temperature of the susceptor powder is from 190° C. to 240° C. Even more preferably, the Curie Temperature of the susceptor powder is from 204° C. to 221° C.

The susceptor used in the heating layer is selected from manganese zinc ferrite, nickel zinc ferrite, strontium ferrite or mixtures thereof. Preferably, the susceptor is a manganese zinc ferrite, commonly referred to as a soft ferrite. When the susceptor is a manganese zinc ferrite, the manganese oxide component can be either in the form of manganese (II, III) oxide ($Mn_3O_4$) or manganese (II) oxide (MnO). When the manganese oxide component is $Mn_3O_4$, the manganese zinc ferrite preferably comprises 5.0 to 27.0 wt % of $Mn_3O_4$; 4.0 to 25.0 wt % ZnO; and 40.0 to 80.0 wt % of $Fe_2O_3$, based on the total weight of the manganese zinc ferrite. More preferably, the susceptor comprises 18.0 to 27.0 wt % of $Mn_3O_4$; 8.0 to 15.0 wt % ZnO; and 40.0 to 70.0 wt % of $Fe_2O_3$, based on the total weight of the manganese zinc ferrite. When the manganese oxide is MnO, the manganese zinc ferrite preferably comprises 6.0 to 17.0 wt % MnO, 60.0 to 76.0 wt % $Fe_2O_3$, 0 to 3.0 wt % $Fe_3O_4$, and 7 to 16.0 wt % ZnO based on the total weight of the manganese zinc ferrite. Preferably, the susceptor is a manganese zinc ferrite. More preferably, the susceptor is a manganese zinc ferrite containing $Mn_3O_4$. Even more preferably, when the susceptor is a manganese zinc ferrite, it is the sole ferrite, i.e., the susceptor is not a mixture of ferrites.

Preferably, the susceptor is sintered. Sintering is a high-temperature treatment of the susceptor where impurities, residual moisture, binders and lubricants are burned out of the product, the material is densified and its magnetic and mechanical properties determined. One example of a sintering process involves gradually increasing the temperature of the susceptor up to about 800° C. in air. Then, the temperature is increased to between 1000 to 1500° F., while introducing a non-oxidizing gas. The susceptor is then cooled.

Polymer Matrix

The polymer matrix in which the susceptor powder is dispersed is selected from a silicone rubber, a liquid crystal polymer, a polyphenylene sulfide polymer or mixtures thereof. These materials provide an optimal balance of positive molding characteristics, thermal and electrical properties and finished product properties.

Liquid crystal polymers are aromatic-based polymers having crystallinity in the liquid state. Such crystallinity can result from either dissolving a polymer in a solvent (lyotropic liquid-crystal polymers) or by heating a polymer above its glass or melting transition point (thermotropic liquid-crystal polymers). Examples of suitable liquid crystal polymers include products marketed under the tradenames Vectran and Zenite.

Polyphenylene sulfide polymers include partially crystalline, high temperature polymers of the general formula:

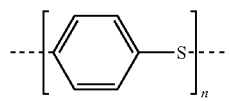

Examples of suitable polyphenylene sulfide polymers include those marketed under the tradename Ryton by Solvay, Fortron by Celanese Corporation or Torelina by Toray Industries Inc.

When the polymer is a silicone rubber it can be selected from a liquid silicone rubber, a high consistency rubber or a room temperature vulcanization rubber. The room temperature vulcanization rubber has a molecular weight of about 20,000 and is typically crosslinked using condensation and addition at room temperature. Condensation crosslinking can occur, e.g., between dihydroxy polydimethyl siloxane and silicates in the presence of dibutyl tin dilaurate or tin (II) octoate catalysts. Addition crosslinking involves the addition of SiH across double bonds in the presence of catalytic salts and complexes of platinum, palladium or rhodium. The reaction proceeds at room temperature when platinum metal/olefin complexes are used. Addition-crosslinking rubbers for high-temperature processing contain nitrogenous platinum complexes, e.g., of pyridine, benzonitrile, or benzotriazole. The liquid silicone rubber and high-consistency rubber preferably have repeating units of Si—O—Si of the general formula:

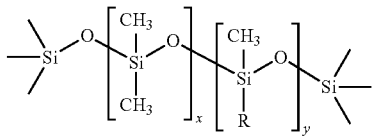

where the liquid silicone rubber has a molecular weight of 900 to 7,600 and a degree of polymerization of 10 to 100, and the high consistency rubber has a molecular weight of 370,000 to 740,000 and a degree of polymerization of 5,000 to 10,000, and where the degree of polymerization is defined as the sum of x and y. R is selected from —OH, —CH$_3$, —CH=CH$_2$, or aryl groups.

Examples of suitable liquid silicone rubbers include those marketed by Wacker under the names of Elastosil®, such as LR3003/70; or by Shenzhen SQUARE Silicone Materials Co., Ltd., such as SQUARE LIM3900-12A/B. Examples of suitable high consistency rubbers include Elasosil® R401/20; CHN3000, marketed by Shin-Etsu Chemical Co., Ltd.; and RBB-2003-30, marketed by Dow Corning.

The high consistency rubber is typically cured using peroxide-induced crosslinking at elevated temperatures. Peroxide crosslinking relies on the formation of free radicals to initiate the reaction. The peroxide catalyst typically decomposes into two free radical-containing components. These components react to transfer the free radicals to the silicone polymer with either alkyl or vinyl functionality.

The liquid silicone rubbers are typically cured using addition curing at elevated temperatures.

The silicone rubbers can include reinforcing and non-reinforcing fillers. Reinforcing fillers primarily include fumed silicas that chemically interact with the silicone to enhance mechanical properties, increase viscosity, and change the glass-transition and crystallization temperature. Non-reinforcing fillers include materials such as chalk, quartz flour, diatomaceous earth, mica, kaolin, talcum, and Al(OH)$_3$. These materials interact weakly with the silicone polymer to raise viscosity and modulus of elasticity of vulcanizations Heating Layer The heating layers are a mixture of the susceptor and polymer matrix, where the susceptor is dispersed in the polymer matrix. Preferably, the heating layers independently comprise 15 to 85 wt % of the susceptor powder and 85 to 15 wt % of the polymer, based on the total weight of the heating layer. Preferably, the heating layers independently comprise 70 to 80 wt % of the susceptor powder and 30 to 20 wt % of the polymer, based on the total weight of the heating layer. Preferably, the first and second heating layers have a Shore A hardness of 5 to 70. More preferably, the Shore A hardness of the first and second heating layers are 20 to 60. Even more preferably, the Shore A hardness of the first and second heating layers are from 30 to 50.

Microwaveable Container

The microwaveable container contains a pan and a pan cover for cooking food. Heating layers composed of a polymer matrix and a susceptor powder are attached to both the pan and the pan cover on the surfaces of the pan and pan cover that do not contact food. The heating layers have a Shore A hardness of 5 to 70. The polymer used as the matrix is selected from a silicone rubber, a liquid crystal polymer, a polyphenylene sulfide polymer or mixtures thereof. The polymer used as the matrix is preferably a silicone rubber. The susceptor used in the heating layer is selected from manganese zinc ferrite, nickel zinc ferrite, strontium ferrite or mixtures thereof. Preferably, the susceptor is manganese zinc ferrite. The susceptor used in the heating layers can be the same or different, and the susceptor content in the polymer matrix can be different in the heating layers to allow varying the heat transfer capabilities of the two layers.

The heating layer is preferably located centrally on the lower surface of the pan bottom and/or the upper surface of the pan cover. The heating layers are attached to the pan and/or pan cover by over-molding, using injection molding or compression molding, and are permanently affixed to the pan bottom and pan cover. The pan and the pan cover are fabricated from a metal selected from stainless steel, carbon steel or aluminum. Preferably, the pan and pan cover are fabricated from stainless steel. More preferably, the pan and pan cover are fabricated from 304 stainless steel.

Preferably, a primer is applied to the bare metal portion of the pan and pan cover to be over-molded with polymer. Suitable primers for application onto the bare metal portion include G790 and G418, marketed by Wacker; XP81-A6361 and XP-00431, marketed by Momentive; DY39-067 marketed by Dow Corning; and Bluestar Silicones M&P Primer. The arrangement of the heating layer in the lower surface of the pan bottom and upper surface of the pan cover allows the heating layer to convert microwave energy to heat energy, which is transferred to the metal pan and/or pan cover, and then subsequently transferred to the food to be cooked. The heat energy transmitted to the food by the metal surfaces cooks and browns the food to have the satisfying taste and texture of conventional stovetop methods of cooking. Further, the use of metal for the pan and pan covers serves to block microwave transmission to the food. It is well known that cooking foods with microwave energy often leads to unappealing consistency and appearance. Here, even though a microwave oven is used, the food is cooked only using thermal energy thus greatly improving the appeal of the food.

The pan cover is designed to fit within the pan to permit continuous contact between the lower surface of the pan cover and the food to be microwaved, by permitting the pan cover to slide vertically up and down within the pan regardless of orientation of the cover. Alternatively it is possible to form both the pan and pan cover as a slight rectangle or other non-square form (not shown) such that in a first orientation the pan cover will slide vertically due to alignment with the pan, but rotating the pan (such as by ninety degrees for a rectangle) to a second orientation will cause portions of the pan cover to rest upon portions of the pan rim with sliding prevented. In this manner, the first orientation may be used to ensure contact of the pan cover with the food to speed cooking or brown both sides of the food, while the second orientation may be used to create a heated space which may be used similar to an oven. In this second orientation it is preferred that the gap formed between the pan rim and the pan cover will be sufficiently small so as to prevent or substantially reduce any entry of microwaves into the interior of the container.

Fabrication of the pan cover can include a raised ledge along the outside peripheral edge of the cover. The raised ledge can include multiple perforations to enhance the adhesion of the over-molded polymer to the metal of the ledge, and promote durability. A vent gap is defined around the periphery of the pan by the clearance between the outer edge of the pan cover and its over-molded polymer layer, and the inside surface of the pan wall, which allows steam to escape during cooking. Outwardly extending vent tabs can be included in the polymeric layer over-molded on the pan cover to guide it within the pan while still allowing venting. Such tabs are oriented parallel to the plane of the pan cover. When present, at least two vent tabs are present on different sides of the pan cover. Preferably, four vent tabs are present.

During microwave cooking, only the metallic portion of the pan and pan cover will contact food. This facilitates the browning capability of the container and promotes uniform cooking. The metal portions of the pan and pan cover that contact the food can be treated with an anti-stick coating to optimize cleaning. Preferably, the anti-stick coating is polytetrafluoroethylene (PTFE), which can be applied using conventional spray equipment.

The upper surface and raised ledge of the pan cover are over-molded with a polymer to provide durability, improve aesthetics and cover the heating layer (if present), so that it cannot under any circumstance contact food. The over-molded polymer is independently selected from a silicone rubber, a liquid crystal polymer, a polyphenylene sulfide polymer or mixtures thereof having a Shore A hardness of 50 to 95. Preferably, the Shore A hardness of the polymer is 60 to 80. Even more preferably, the Shore A hardness of the over-molded polymer is greater than the hardness of the heating layers discussed above. Preferably, a primer is applied to the bare metal surface prior to over-molding. The over-molding of the raised ledge includes the lower surface of the raised ledge on the lower surface of the pan cover.

The pan cover is also equipped with a handle to permit ease of handling. The handle is preferably pre-molded separately and attached to the upper side of the pan cover by placing it in the mold prior to the over-molding process. Further, as discussed above, over-molding of the pan cover can include over-molding the lower surface of the pan cover at the outside periphery. This corresponds to the lower surface of the raised ledge of the pan cover, when present. Finally, the over-molding of the pan cover can include downwardly extending tabs from the lower surface of the pan cover to provide a minimum clearance between the metal of the pan cover and the metal of the pan, to prevent electrical arcing during operation of the microwave. Outwardly extending vent tabs can also be included in the over-molding of the pan cover to orient the pan cover within the pan. When present, at least two of the vent tabs are present. Preferably, four vent tabs are present.

The pan is composed of the pan bottom which contacts the food, a continuous wall that extends upwardly from the pan bottom, a first heating layer, a first polymeric layer and a preferably a rim that extends outwardly from the top of the continuous wall. The pan bottom also contains a gutter arranged to extend around the base of the continuous wall to collect liquids produced in the cooking process.

The pan is also over-molded with a polymer as described above for the pan cover. The polymer used for over-molding the pan can be the same or different than the polymer used to over-mold the pan cover. The lower side of the pan bottom is over-molded with the polymer, again to improve durability and aesthetics, as well as to prevent the heating layer (if used) from exposure to food. The upper and lower surfaces of the pan rim and the outer surface of the continuous wall can also be over-molded. The outwardly extending rim is oriented parallel to the plain of the pan bottom. Finally, the over-molding of the lower side of the pan bottom can include downwardly extending feet to stabilize the pan in the microwave. Preferably, before polymer is over-molded onto the bare metal of the pan, primer is applied to the bare metal.

The continuous wall preferably has an angle with respect to the vertical axis of the pan, of from 1 to 4 degrees to enhance the over-molding process. Preferably, the angle with respect to the vertical axis is from 2 to 3 degrees.

In another embodiment, the outer surface of the continuous wall is also over-molded by the polymer, so that the entire outside of the pan is covered with an over-molded polymeric layer.

Process for Fabricating the Microwave Container

The microwaveable container is prepared by first deep drawing a first metal blank to form an unfinished pan comprising a bottom, a continuous wall projecting upwards and connected to the pan bottom at the base of the wall and extending along the pan bottom periphery, and a rim extending outwards from the top of the continuous wall. The pan bottom comprises an upper surface that contacts the food and a lower surface that contacts a heating layer. The continuous wall has an inner surface, that faces the interior of the pan, and which may contact the food being cooked, and an outer surface. A gutter for collecting liquids produced in the cooking process extends along the base of the continuous wall. The rim contains a top surface, a bottom surface, and an outer edge. Preferably, the rim is pierced to form a series of perforations.

Deep drawing the metal blank is a metal working process typically done at room temperature. The drawing process is considered deep drawing, rather than metal stamping, when the part is pulled (drawn) into a die cavity and the depth of the recess equals or exceeds the minimum part width. Deep drawing uses radial tension-tangential compression to shape the metal blank into a hollow vessel that may be cylindrical or box-shaped, with straight or tapered sides. The presses used for deep drawing are well known to those skilled in the art.

Next, a second metal blank is deep drawn to form an unfinished pan cover, as with the unfinished pan. The pan cover contains an upper surface that contacts a heating layer, a lower surface that contacts the food being cooked, and an outer side edge. Preferably, the unfinished pan cover comprises a ledge extending along the outer periphery of the pan cover that is raised relative to the remainder of the pan cover upper surface. Preferably, the ledge is pierced to provide a series of perforations. These perforations enhance the adhesion of the over-molded material to the ledge during the over-molding step, and enhance its durability.

In the case of the pan rim and the pan cover's raised ledge, these can be temporarily covered prior to the application of an anti-stick coating; for example, a temporary gasket can be installed on the rim and ledge. This assures that the surface preparation for application of the anti-stick coating and the anti-stick coating itself will not be applied to the raised ledge or rim prior to the over-molding, since these would degrade adhesion between the metal and the over-molded polymer.

To achieve improved adhesion between the metallic rim and the polymer during the over-molding step and enhance durability, the rim is preferably pierced to form a plurality of perforations in the rim of the unfinished pan. A nonstick coating is then applied to the pan bottom surface, the continuous wall inner surface, and the pan cover lower surface. To improve bonding between the unfinished metal pan and the heating layer, a primer may be applied to the metal surface.

A heating layer comprising a susceptor powder dispersed in a polymer matrix is then over-molded onto the pan bottom lower surface, thereby forming a treated pan bottom. The heating layer is positioned centrally in the pan bottom lower surface. Preferably, the heating layer is positioned in the pan bottom lower surface bounded by the gutter, i.e., the raised section of the pan bottom corresponding to the gutter. The over-molding can be performed using an injection molding process or a compression molding process. Conventional injection molding or compression molding equipment can be used.

A heating layer is also over-molded onto the pan cover upper surface, thereby forming a treated pan cover. The heating layer is positioned centrally on the upper surface of the pan cover. Preferably, the heating layer is positioned in the area of the pan cover upper surface bounded by the raised ledge.

Since both the pan bottom lower surface and the pan cover upper surface are over-molded with a polymeric layer after the heat layer has been over-molded onto a deep drawn blank, the over-molded polymeric layer on each may contact both the heating layer and the metal of the deep drawn blank. Preferably, to promote adhesion between the polymeric layer and the bare metal, a primer is applied. A primer is not applied to the heating layer outer surface.

A handle may then attached to the treated pan cover, thereby forming a molded assembly. The handle may be attached in any manner known to those known to those skilled in the art, e.g., using adhesives. Preferably, the handle is pre-molded but molding the handle monolithically with the overmold is possible. More preferably, the handle is pre-molded from a polymer selected from a silicone rubber, a liquid crystal polymer, a polyphenylene sulfide polymer or mixtures thereof, as described above. The molded handle is preferably attached to the treated pan cover by inserting the molded handle into a mold before the treated pan cover is over-molded, and then over-molding a second polymeric layer.

Finally, a polymeric layer is over-molded onto the molded assembly and onto the treated pan bottom. The polymeric layer is selected from a silicone rubber, a liquid crystal polymer, a polyphenylene sulfide polymer or mixtures thereof, as described above. The polymeric layer on the molded assembly and the treated pan bottom can be the same or different.

The heating layers and polymeric layers are over-molded onto the pan bottom lower surface and the pan cover upper surface using an injection molding process or a compression molding process. Conventional molding equipment can be used for both the injection molding and the compression molding process.

After the over-molding has been completed, the microwaveable container is heated, for example at 200° C. for 4 hours to eliminate volatile organic compounds (VOC).

Referring to FIG. 1, shown is a cutaway view of a microwaveable container 1. Pan cover 3 fits within pan 2, such that a vent gap 30 exists between the pan cover side edge 23 and the inner surface of the continuous wall 5. The upper surface of the pan cover 3 is over-molded with a second polymeric layer 24. A molded handle 37 is attached to the pan cover 3. A downwardly extending tab 32 of the pan cover 3 defines a minimum distance between the pan cover lower surface and the pan upper surface to prevent arcing in the microwave when it is operational. A second heating layer 25 is over-molded onto the upper surface of the pan cover 3. The lower surface 28 of the second heating layer 25 is attached to the pan cover upper surface by over-molding. The upper surface 27 of the second heating layer 25 in the pan cover 3 is covered by the over-molded second polymeric layer 24. First heating layer 10 is attached to the bottom 4 of the pan 2 by over-molding. The upper surface 11 of the first heating layer 10 is attached to the bottom 4 of pan 2. The lower surface 12 of the first heating layer 10 is over-molded by the first polymeric layer 7. The first polymeric layer 7 also covers the pan rim. Pan 2 has a continuous wall 5 with a top 14 and a bottom 15. A gutter 34 for collecting fluid produced during cooking extends along the base 15 of the continuous wall 5. The outer surface 17 of the continuous wall 5 is shown as bare metal. In other embodiments, the outer surface 17 can be covered with the first polymeric layer 7. Downwardly extending feet 35 (shown here as monolithically molded) serve to stabilize the microwaveable container 1 in the microwave as well as maintaining a minimum distance between the pan bottom 4 and the bottom of the microwave so as to ensure exposure of the pan bottom to microwave energy.

Figure 2:
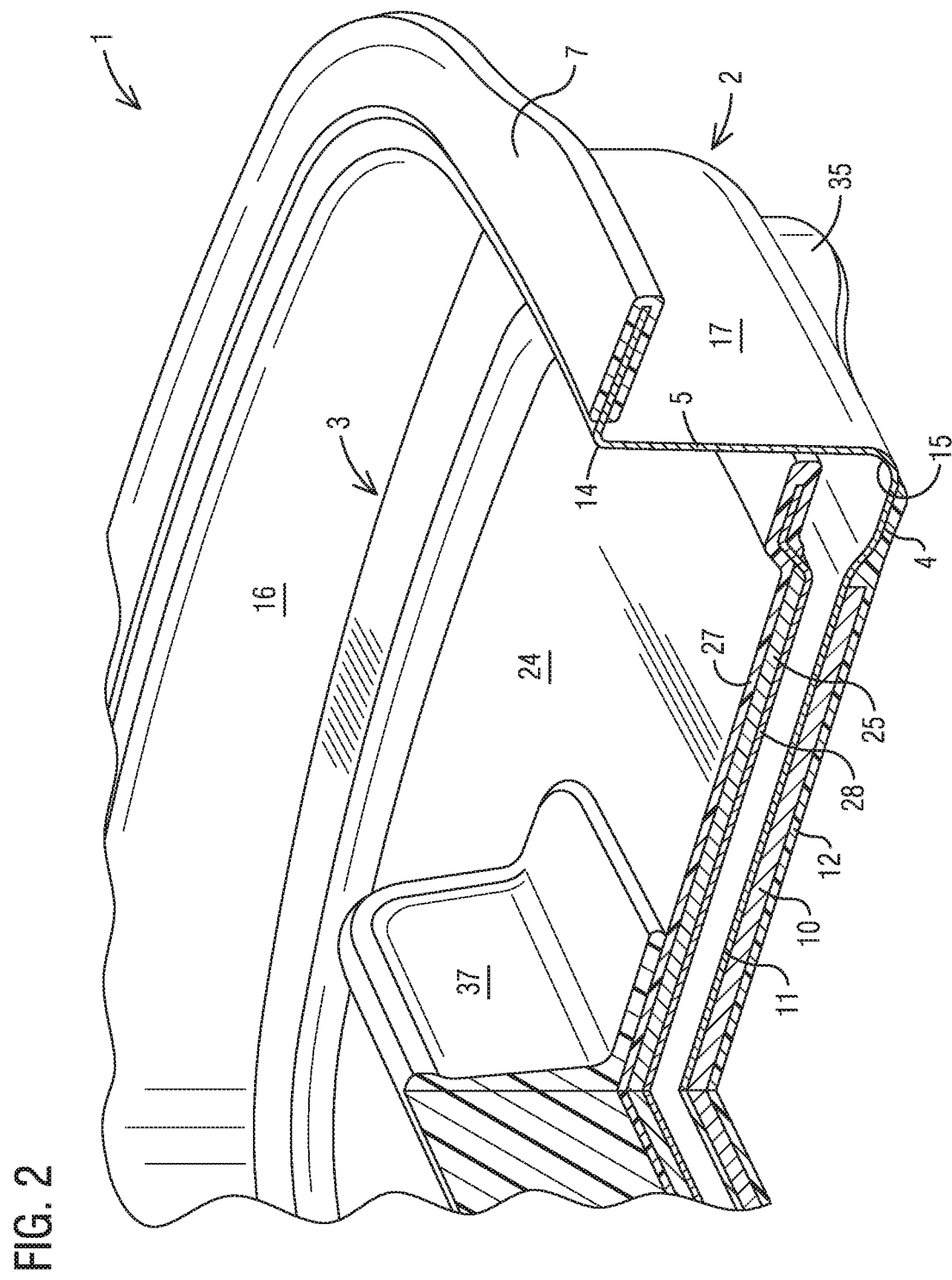
FIG. 2 illustrates a cut-away view of the microwaveable container with the pan cover at a point lowered into the pan.

Referring to FIG. 2, shown is a cutaway view of a microwaveable container 1. Pan cover 3 fits within pan 2, resting on the top of the food to be cooked, and in this square embodiment may slide up and down within pan 2 depending on the height of the food in the container. The upper surface of the pan cover 3 is over-molded with a second polymeric layer 24. A molded handle 37 is attached to the upper surface of pan cover 3. A second heating layer 25 has been over-molded onto the upper surface of the pan cover 3. The lower surface 28 of the heating layer 25 is attached to the pan cover upper surface by over-molding. The upper surface 27 of the heating layer 25 in the pan cover 3 is covered by the over-molded second polymeric layer 24. First heating layer 10 is attached to the bottom 4 of the pan 2 by over-molding. The upper surface 11 of the first heating layer 10 is attached to the lower surface of the bottom 4 of pan 2 by over-molding. The lower surface 12 of the first heating layer 10 is over-molded by the first polymeric layer 7. The first polymeric layer 7 also over-molds the pan rim. Pan 2 has a continuous wall 5 with a top 14 and a base 15. The outer surface 17 of the continuous wall 5 is shown as bare metal. In other embodiments, the outer surface 17 can be covered with the first polymeric layer 7. Downwardly extending molded feet 35 serve to stabilize the microwaveable container 1 in the microwave, as well as maintaining a minimum distance between the pan bottom 4 and the bottom of the microwave.

Figure 3:
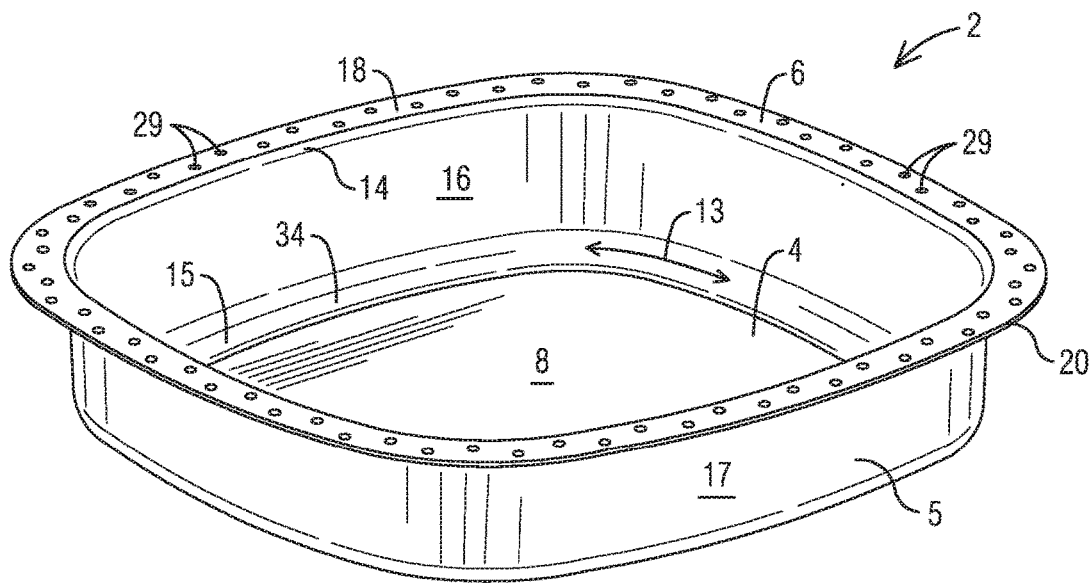
FIG. 3 illustrates a deep drawn blank of the pan.

Referring to FIG. 3, shown is a view of deep-drawn pan 2. Pan 2 includes a bottom 4 with an upper surface 8 for contacting food, upwardly extending continuous wall 5, and outwardly extending rim 6. Continuous wall 5 has an inner surface 16 for contacting food and outer surface 17, a top 14, and a base 15. Gutter 34 for collecting liquids produced during the cooking of the food extends along the periphery of the pan bottom 4 at the base 15 of the continuous wall 5. Rim 6 has a plurality of perforations 29 that enhance over-molding of the rim 6, a top surface 18, and an outer side edge 20.

Figure 4:
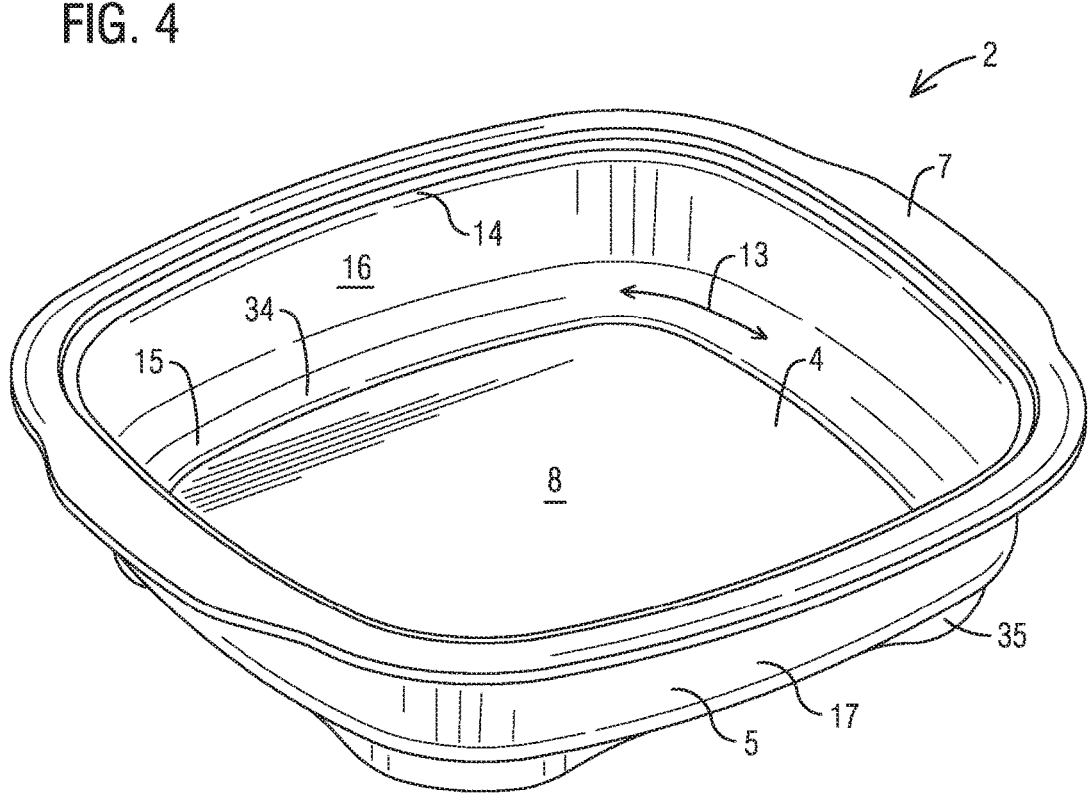
FIG. 4 illustrates a deep drawn blank of the pan with a polymeric layer over-molded onto the pan rim, and molded feet on the lower side of the pan bottom.

Referring to FIG. 4, shown is view of deep-drawn pan 2 where the rim has been over-molded with first polymeric layer 7. Downwardly extending molded feet 35 serve to stabilize the microwaveable container in the microwave as well as defining a minimum distance between the pan bottom 4 and the bottom of the microwave. Pan 2 includes a bottom 4 with an upper surface 8 for contacting food, and an upwardly extending continuous wall. The continuous wall has an inner surface 16 for contacting food and outer surface 17. Gutter 34 for collecting liquids produced during cooking of the food extends along the periphery 13 of the pan bottom 4 at the base 15 of the continuous wall.

Figure 5:
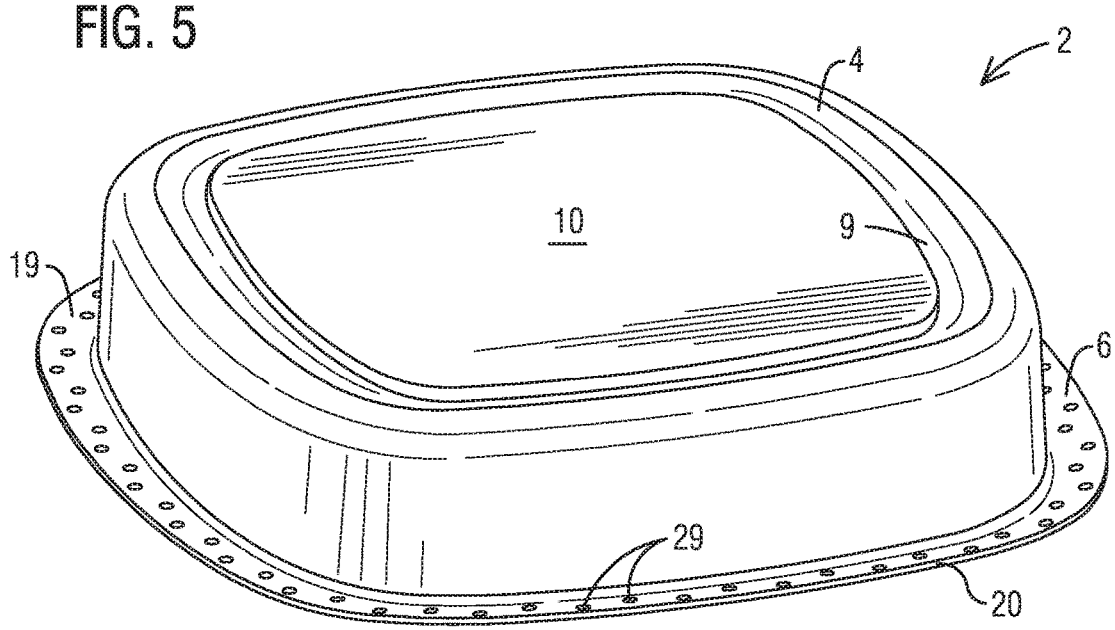
FIG. 5 illustrates a bottom view of the pan, with the heating layer centrally over-molded onto the pan bottom.

Referring to FIG. 5, shown is a bottom view of pan 2. Rim 6 has a bottom surface 19, a plurality of perforations 29, and an outer side edge 20. First heating layer 10 has been over-molded onto the lower surface 9 of pan bottom 4 in the space bounded by the pan gutter.

Figure 6:
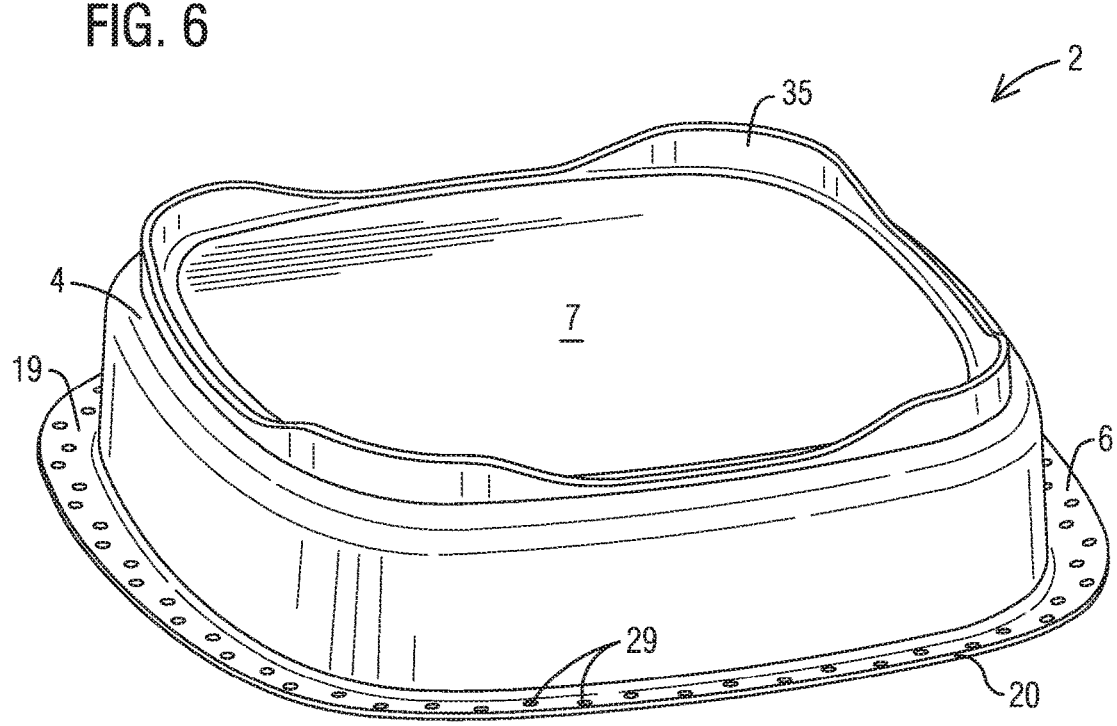
FIG. 6 illustrates a bottom view of the pan with a polymeric layer over-molded to the pan bottom and heating layer.

Referring to FIG. 6, shown is a bottom view of pan 2. Rim 6 has a bottom surface 19, a plurality of perforations 29, and an outer side edge 20. First polymeric layer 7 has been over-molded onto pan bottom 4, including both the pan bottom lower surface and the first heating layer 10. First polymeric layer 7 includes downwardly extending molded feet 35 to stabilize the pan 2 in the microwave as well as maintaining a minimum distance between the pan bottom 4 and the bottom of the microwave.

Figure 7:
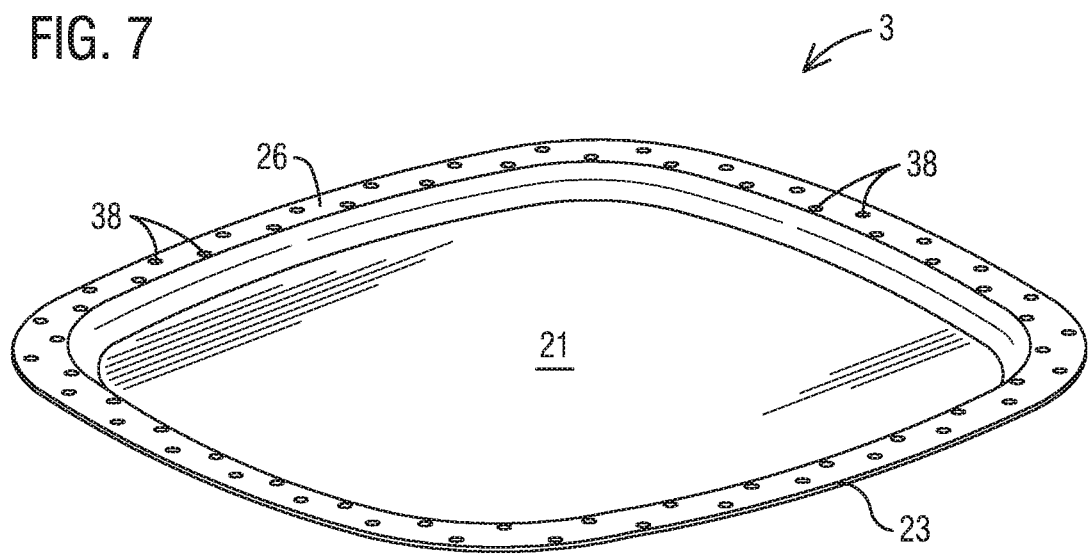
FIG. 7 illustrates a deep drawn blank of the pan cover having a raised ledge.

Referring to FIG. 7, shown is a drawn metal blank of pan cover 3. Pan cover 3 contains an upper surface 21. Drawing of a metal blank creates a raised ledge 26 from upper surface 21. Raised ledge 26 contains a plurality of perforations 38 that enhance over-molding of the second polymeric layer, and promote durability.

Figure 8:
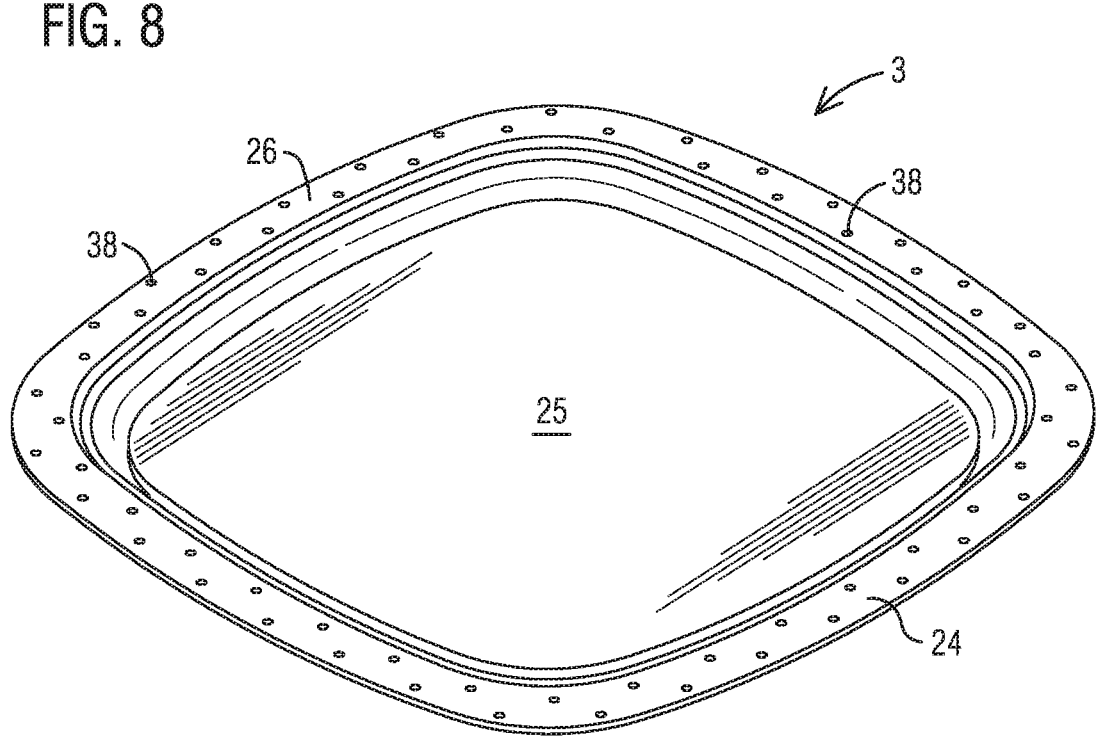
FIG. 8 illustrates the pan cover with the raised ledge over-molded with the polymeric layer and a heating layer over-molded onto the area bounded by the raised ledge.

Referring to FIG. 8, shown is a pan cover 3 having raised ledge 26 containing a plurality of perforations 38. Raised ledge 26 has been over-molded with second polymeric layer 24. The central portion of pan cover 3 has been over-molded with second heating layer 25 in the area bounded by raised ledge 26.

Figure 9:
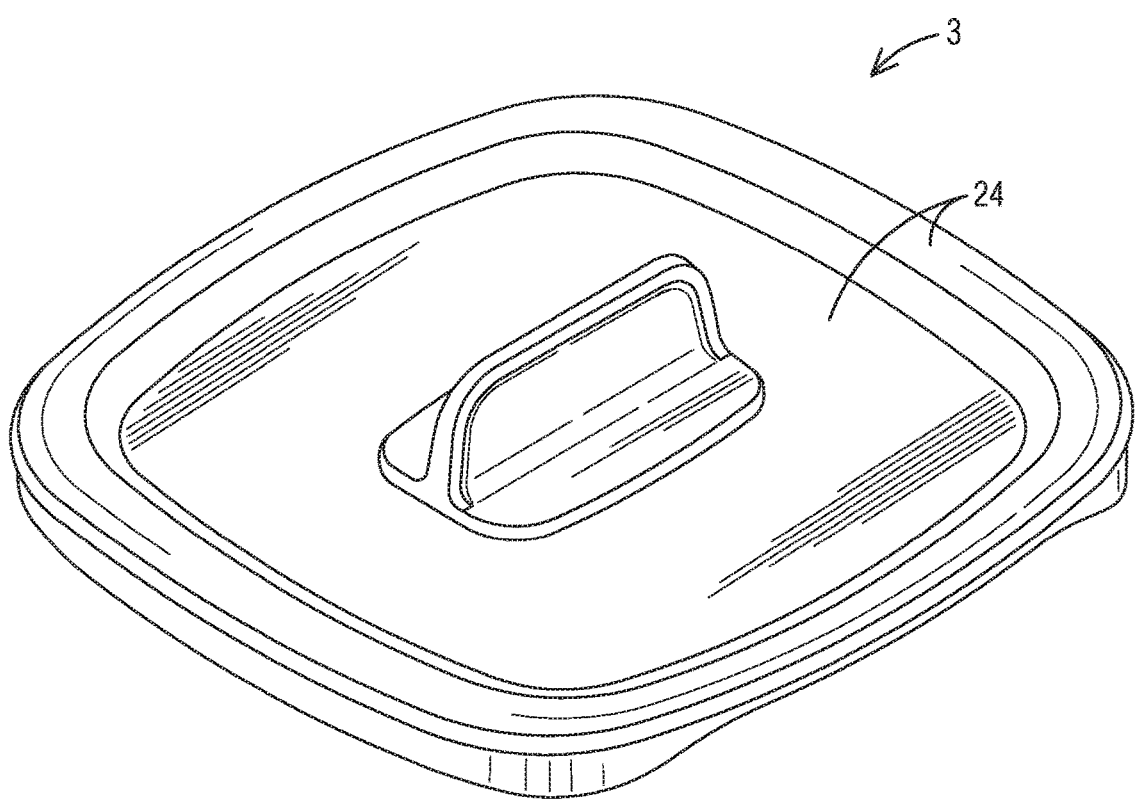
FIG. 9 illustrates an over-molded pan cover with handle.

Referring to FIG. 9, shown is pan cover 3 fully over-molded with second polymeric layer 24 and molded handle 37.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A microwaveable container comprising a pan and a pan cover,
the pan comprising a bottom, a continuous wall, a rim, and a first polymeric layer,
the bottom comprising an upper surface and a lower surface,
the continuous wall projecting upwardly along the periphery of the bottom, and comprising a top, a base, an inner surface and an outer surface,
the rim extending outwardly from the top of the continuous wall, and comprising a top surface, a bottom surface, and an outer side edge, and
the first polymeric layer being attached to the rim top surface, the outer side edge of the rim, and the lower surface of the pan bottom; and
the pan cover comprising an upper surface, a lower surface, an outer side edge, and a second polymeric layer, wherein the pan cover fits within and is slidable vertically up and down within the continuous wall of the pan for contact between the lower surface of the pan cover with food,
the second polymeric layer is attached to the pan cover upper surface and the pan cover side edge,
and wherein both of said pan and said pan cover further includes a heating layer, the heating layer associated with said pan being a first heating layer and the heating layer associated with said pan cover being a second heating layer,
the first heating layer comprising an upper surface and a lower surface, the upper surface of the first heating layer being attached to the lower surface of the bottom of said pan and the lower surface being attached to the first polymeric layer,
the second heating layer comprising an upper surface and a lower surface, the lower surface of the second heating layer being attached to the upper surface of the pan cover and the upper surface being attached to the second polymeric layer.

2. The container of claim 1 wherein each said heating layer independently comprising:
a susceptor powder selected from manganese zinc ferrite, nickel zinc ferrite, strontium ferrite or mixtures thereof; and
a polymer matrix selected from a silicone rubber, a liquid crystal polymer, a polyphenylene sulfide polymer or mixtures thereof,
the susceptor powder being dispersed in the polymer matrix.

3. The container of claim 2 wherein each said heating layer comprises 15 to 85 wt % of the susceptor powder and 85 to 15 wt % of the polymer based on the total weight of the heating layer.

4. The container of claim 3 wherein each said heating layer comprises 70 to 80 wt % of the susceptor powder and 30 to 20 wt % of the polymer based on the total weight of the heating layer.

5. The container of claim 3 wherein the susceptor powder has an average particle diameter from 1 to 500 microns.

6. The container of claim 3 wherein the average particle diameter of the susceptor powder is from 1 to 13 microns.

7. The container of claim 3 wherein the susceptor powder has a Curie Temperature from higher than 175° C. to lower than 260° C.

8. The container of claim 7 wherein the Curie Temperature of the susceptor powder is from 190° C. to 240° C.

9. The container of claim 8 wherein the Curie Temperature of the susceptor powder is from 204° C. to 221° C.

10. The container of claim 3 wherein the susceptor powder is sintered.

11. The container of claim 3 wherein the susceptor is a manganese zinc ferrite.

12. The container of claim 11 wherein the manganese zinc ferrite comprises 5.0 to 27.0 wt % of $Mn_3O_4$; 4.0 to 25.0 wt % ZnO; and 40.0 to 80.0 wt % of $Fe_2O_3$, based on the total weight of the manganese zinc ferrite.

13. The container of claim 12 wherein the manganese zinc ferrite comprises 18.0 to 27.0 wt % of $Mn_3O_4$; 8.0 to 15.0 wt % ZnO; and 40.0 to 70.0 wt % of $Fe_2O_3$, based on the total weight of the manganese zinc ferrite.

14. The container of claim 1 wherein the polymer matrix is a silicone rubber.

15. The container of claim 14 wherein the silicone rubber is selected from a liquid silicone rubber or a high consistency rubber.

16. The container of claim 15 wherein the liquid silicone rubber or high-consistency rubber have repeating units of Si—O—Si of the general formula:

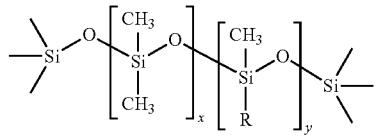

wherein
the liquid silicone rubber has a molecular weight of 900 to 7,600, and a degree of polymerization of 10 to 100,
the high consistency rubber has a molecular weight of 370,000 to 740,000 and a degree of polymerization of 5,000 to 10,000,
the degree of polymerization is the sum of x and y, and R is selected from OH, —$CH_3$, —CH=$CH_2$, or aryl groups.

17. A process for fabricating a microwaveable container, the process comprising:
deep-drawing a first metal blank to form an unfinished pan comprising a bottom, a continuous wall, and a rim;
the bottom comprising an upper surface and a lower surface,
the continuous wall projecting upwardly along the periphery of the bottom, and comprising a top, a base, an inner surface and an outer surface,
the rim extending outwardly from the top of the continuous wall, and comprising a top surface, a bottom surface, and an outer edge;
deep-drawing a second metal blank to form an unfinished pan cover, the pan cover comprising an upper surface, a lower surface, and an outer side edge;
piercing the rim to form a plurality of perforations in the rim of the unfinished pan;
applying a nonstick coating to the pan bottom upper surface, continuous wall inner surface and pan cover lower surface;
over-molding a heating layer comprising a susceptor powder dispersed in a polymer matrix onto both of
the pan bottom lower surface, and
the pan cover upper surface,
over-molding a polymeric layer onto the pan bottom lower surface and pan rim, wherein the outer surface of the continuous wall is bare metal,
over-molding a polymeric layer onto the entire upper surface of the pan cover and just the outside periphery of the lower surface of the pan cover.

18. The process of claim 17 further comprising applying a primer to the pan bottom lower surface prior to over-molding with the heating layer.

19. The process of claim 17 further comprising applying a primer to the pan cover upper surface prior to over molding with the heating layer.

20. A microwaveable container comprising:
a pan comprising:
a first metal layer defining a pan bottom having an upper surface which contacts food and a continuous wall extending upwardly from the pan bottom, thereby defining a cavity for receiving food;
a first heating layer having an upper surface and an opposing lower surface, the upper surface is attached to a surface of the first metal layer opposite the upper surface which contacts food; and
a first polymeric layer covering the lower surface of the first heating layer and in contact with the first metal layer; and
a pan cover comprising:
a second metal layer defining a cover bottom having a lower surface which contacts food;
a second heating layer having an upper surface and an opposing lower surface, the lower surface is attached to a surface of the second metal layer opposite the lower surface which contacts food; and
a second polymeric layer covering the upper surface of the second heating layer and in contact with the second metal layer;
wherein the pan cover fits within the cavity of the pan and is slidable vertically up and down within the cavity for contact between the lower surface of the second metal layer and food.

21. The container of claim 20, wherein the pan cover defines a vent gap between a side edge of the pan cover and an inner surface of the continuous wall of the pan.

22. The container of claim 20, wherein the pan cover further comprises a tab extending toward the pan bottom, wherein the tab defines a minimum distance separating the lower surface of the second metal layer from the upper surface of the first metal layer.

23. The container of claim 22, wherein the second polymeric layer form the tab.

24. The container of claim 20, wherein the first polymeric layer is over-molded to the first heating layer and the first metal layer, and the second polymeric layer is over-molded to the second heating layer and the second metal layer.

* * * * *